Oct. 17, 1933.  M. MICHEL  1,930,903

PRESSING BOX FILTER PROTECTION

Filed April 21, 1930

*Fig.2ª*

Inventor
Max Michel
by
Attorney

Patented Oct. 17, 1933

1,930,903

UNITED STATES PATENT OFFICE 1,930,903

PRESSING BOX FILTER PROTECTION

Max Michel, Hamburg, Germany

Application April 21, 1930. Serial No. 446,151

3 Claims. (Cl. 100—54)

This invention relates to a pressing box filter protection, especially for pressing boxes of hydraulic cocoa presses, in which the cocoa butter is pressed out of the cocoa mass by the application of high pressures, approximately 200 to 600 atms. and more. By the use of this filter protection it is possible to utilize in the hydraulic high pressure presses filtering means (filter plates or filter arrangements) and the like consisting of the finest, thinnest metal gauzes with narrowest meshes. The filtering means permit of obtaining from the cocoa mass a cocoa butter clear already in the first drops. This was not possible hitherto with any of the known metal filtering means as these were clogged with the pressing material (constituents of cocoa) so that it was not possible to ensure a uniform filtering property. By the application of the pressing box filter protection with the metal gauzes these inconveniences are obviated and a uniform rapid pressing is ensured.

The invention is essentially characterized by a perforated metal plate, on the filter means (filter plate, filtering arrangement) comprising preferably several metal gauzes, on the side facing the pressing material.

An embodiment of the invention is shown by way of example in the accompanying drawing in which Fig. 1 shows in section the arrangement of the pressing box filter protection in the pressing box.

Figure 2a is a detail sectional view showing another modified form of filter.

Figure 1:
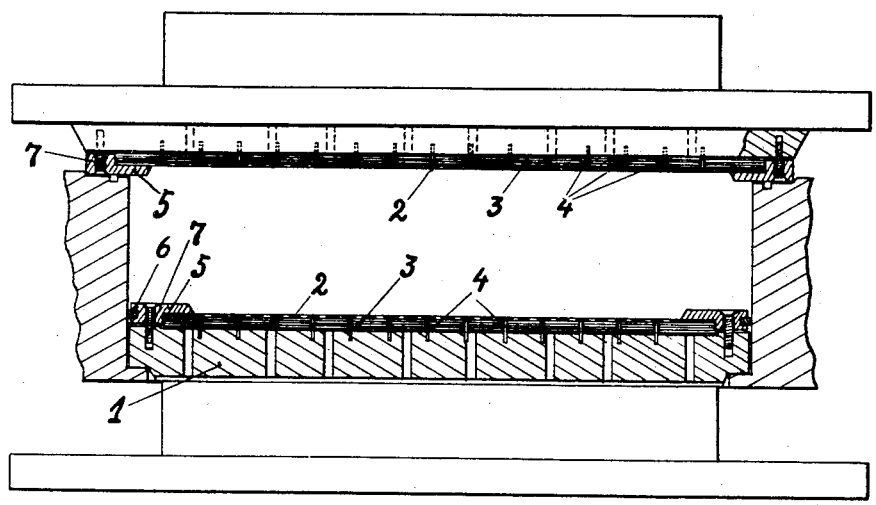

On the base plate 1 the coarsely perforated pressing box filter protecting plate 2 is arranged, between which and the base plate 1 a number of metal gauzes 3 are fixed by means of screws 4, the fineness of the meshes of the plates increasing towards the plate 2. The pressing box filter protecting plate 2 is enclosed by a clamping ring 5, comprising a packing 6, and fixed on the base plate 1 by means of screws 7. The filter protecting plate arranged on the top is similarly constructed.

Figure 2:
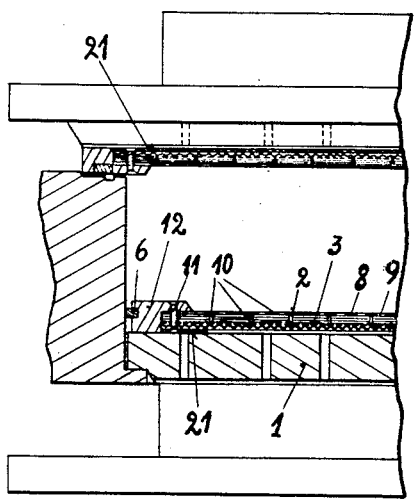
Figure 2 is a fragmentary sectional view showing another form of filter.
Figure 2:
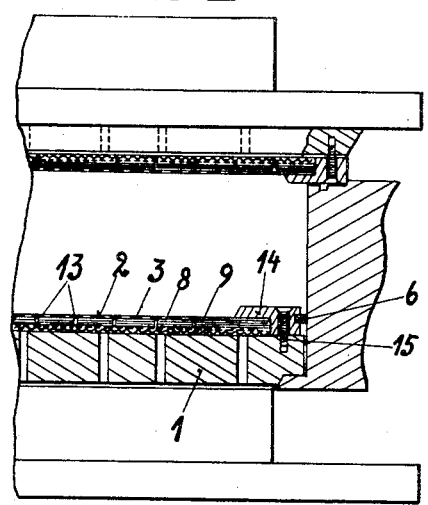
Figure 3:
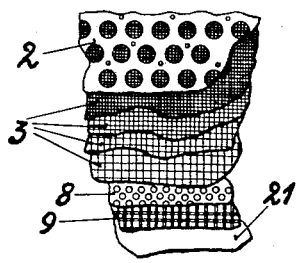
Fig. 3 shows in section a portion of the pressing box filter protecting plate with the wire gauzes.

Another form of construction is obtained by the arrangement of the pressing box filter protecting plate 2 when the same is united with the wire gauzes 3 and a plate 8, having narrow perforations, by means of rivet connections 10, the plate thus formed being framed by a ring 12 with packing 6 connected with the plate by means of rivets 11 or the like and on which, on the side remote from the pressing material, a distribution wire gauze 9 having wide meshes and a metal plate or ring 21 are fixed by the rivets 11 in order to prevent clogging of the wide mesh distribution gauze and to fix the same. The protecting filter plate formed in this manner, shown in Fig. 2, rests freely on the base plate 1. The arrangement of the upper pressing box filter plate is identical to that of the lower plate. Figure 2a shows the pressing box filter protecting plate 2 with the wire gauzes 3 and the narrowly perforated plate 8 securing the wire gauzes 3 in position and connected with the plate 2 by rivets 13, said plate 8 being secured in position, with interposition of a wide mesh distributing wire gauze 9, by a clamping ring 14 having a packing 6 and fixed on the base plate by means of screws 15. The pressing box filter protecting plate 2 itself can have various apertures or bores.

I claim:—

1. A flat circular filter for pot presses, especially hydraulic cocoa presses, comprising in combination a filtering means of fabric, a flat metallic filter protecting means on the side of said filtering means adjacent the material to be pressed and having apertures of a length and width equal to several times the thickness of the protecting means, fixing means distributed at relatively short distances apart over the entire surface of said filter protecting means adapted to press said filter protecting means tightly against the entire surface of said filter means, a clamping ring having a circumferential groove, an outer packing in said ring groove, and means for fixing the filter with said clamping ring on the press plates.

2. A flat circular filter for pot presses, especially hydraulic cocoa presses, comprising in combination a filtering means consisting of a plurality of superposed layers of fine metal fabrics, the interstices of said fabrics becoming narrower towards the material to be pressed, a flat circular metallic filter protecting means on the side of said filtering means adjacent the material to be pressed and having apertures of a length and width several times the thickness of the protecting means, fixing means distributed over the entire surface of said protecting means adapted to press said protecting means tightly against the entire surface of said filtering means, a plurality of coarse metal fabrics on the side of said filtering means remote from the material to be pressed, a finely perforated plate interposed between the two outermost coarse metal fabrics and engaged by said fixing means, a protecting ring on the side of the filter remote from the material to be pressed, means for connecting all elements of the filter at the edge to form a light, convenient, united, exchangeable body, and means for holding the filter in operative position in the press.

3. A flat circular filter plate for pot presses, especially hydraulic cocoa presses, comprising in combination a filtering means consisting of a plurality of superposed layers of fine and coarse metal fabrics, the fine metal fabric layers being adjacent the material to be pressed and the coarse metal fabric layers on the side remote from the material to be pressed, a flat circular metallic filter protecting means over said fine metal fabric layers having apertures of a length and width many times greater than the thickness of the protecting means, a large number of fixing means distributed over the entire surface of said protecting means adapted to press said protecting means tightly against the entire surface of said filtering means, a finely perforated plate interposed between said coarse metal fabric layers on the side of said filtering means remote from the material to be filtered and engaged by said fixing means, a flat protecting means on the outer side of said filtering means remote from the material to be pressed, a ring-shaped holding frame engaging over and around the filter having a groove, an outer packing in said groove, and means for connecting at the edge all the elements of the filter to said ring-shaped holding frame to form a unitary structure.

MAX MICHEL.